Patented May 19, 1925.

1,538,366

UNITED STATES PATENT OFFICE.

RICHARD WILLSTÄTTER AND HARRY SOBOTKA, OF MUNICH, GERMANY.

MANUFACTURE OF YEAST PREPARATIONS FOR BAKING, DIETETIC, AND THERAPEUTIC PURPOSES.

No Drawing. Application filed January 3, 1923. Serial No. 610,497.

*To all whom it may concern:*

Be it known that we, RICHARD WILLSTÄTTER and Dr. HARRY SOBOTKA, citizens of Germany and Austria resp., residing at Munich, Bavaria, Germany, have invented certain new and useful Improvements in the Manufacture of Yeast Preparations for Baking, Dietetic, and Therapeutic Purposes; and we do hereby declare the following to be a full, clear, and exact description of the invention, such as will enable others skilled in the art to which it appertains to make and use the same.

It is well known brewers' and bakers' yeast can be liquefied by adding certain soluble substances. If, for example, to ten parts of pressed yeast there is added one part of finely powdered kitchen salt (sodium chloride) the mixture at once forms a homogeneous liquid, mass and the same is the case if sugar is used. One part of finely powdered sugar added to ten parts of yeast causes spontaneous liquefaction, followed by fermentation.

If, however, pressed yeast is mixed with sugar e. g. in the proportion of 1:1, liquefaction also occurs at once, but it is a surprising fact that fermentation does not follow. A durable, yellowish or brown mass is obtained, containing many of the yeast cell constituents in a dissolved but otherwise unchanged state, more particularly the enzymes and vitamines. This substance has the flavor of yeast, so that it is not suitable as an article of food.

We have however, found that the flavor of yeast liquefied by addition of sugar is changed in a quite astonishing manner by subjecting the same to heat. The distinctive yeast flavor disappears, and gives place to a pleasant aromatic flavor, somewhat like that of honey. This may be due to the following circumstances. By the action of the sugar on the yeast during the heating process the yeast cells are entirely emptied, and the enzymes released together with the other constituents effect inversion of the saccharose. The combination of the invert sugar with nitrogenous constituents of the yeast results, in the course of the heating, in the production of valuable flavoring matters, somewhat as is the case with roast malt.

We will now give a typical example of the process.

100 kg. of well washed and powerfully pressed brewers' yeast, containing 25 to 30% of dry matter are placed in a kneading apparatus having a heating appliance, and are quickly mixed therein with about 150 kg. of finely ground cane sugar. In the course of about 1 hour the liquefied mass, with the kneading apparatus still working, is slowly raised to 55° C. (131° Fahrenheit), and is kept at this temperature for about an hour. Then in the course of another hour the temperature is raised to from 85 to 110° C. (185 to 230° Fahrenheit,) and this temperature is preferably maintained for about an hour. Then the mass is cooled. The finished product is a thick brown liquid extract, of very pleasant flavor which is specially well adapted for baking purposes, by reason of its enzyme content. The enzymes which it contains may be preserved more or less as required by using care in the heating process. Its vitamine content also favours the action of the yeast in the preparation of dough. The presence of yeast derivatives, such as amino acids, stimulants, ethers, and genuine albumenous matters is exceedingly favorable to the fermentation. The fructose which results from the inversion of the cane sugar, and is easily caramelized, assists the rapid browning of the crust, and improves it. It also improves the aroma, as does the simultaneous action of nitrogenous derivatives on the invert sugar, as in the case of roast malt. Added to pies and cakes made with baking powder, and to ginger bread or any other sweetened confectionery, the extract imparts the pleasant aroma of goods baked with yeast, and serves as a partial or complete substitute for sugar. The extract may also be used as a baking preparation, for improving other known preparations, such as enzymatic malt extract.

The product is distinguished from the vitamine preparation now in use by its excellent flavor, and is adapted both for food purposes and for therapeutic purposes. In the case of catarrhic affections it has a favorable effect on the mucous membranes of the respiratory organs. It is a mild laxative. In particular, however, it affords in a high degree the well known benefits derivable from yeast vitamines. It may be taken in the liquid state, in the manner of jam, honey or malt extract, or it may be made up in the form of jelly or sweets, plain or in combination, as for example as a filler for chocolates. It may also be subjected to a drying process, by methods such as used for malt extract, or may be mixed with dry substances, for example flour or cocoa powder and thus reduced to a dry state.

What we claim as our invention and desire to secure by Letters Patent of the United States is:—

1. The process of producing a yeast preparation rich in vitamines and enzyms, which consists in liquefying yeast by mixing therewith sugar in a quantity sufficient to prevent fermentation.

2. An article of manufacture for use as a baking preparation consisting of yeast and sugar mixed therewith in a proportion which produces liquefaction but not fermentation.

3. The process of producing a yeast preparation rich in enzymes and vitamines, which consists in heating to a temperature exceeding sixty degrees C. a mixture consisting of yeast and sufficient sugar to prevent fermentation.

4. The process of producing a yeast preparation rich in enzymes and vitamines, which consists in heating step by step to a temperature exceeding sixty degrees C. a mixture consisting of yeast and sufficient sugar to prevent fermentation.

5. The process of producing a yeast preparation rich in enzymes and vitamines, which consists in heating step by step to a temperature of about 100° C. a mixture consisting of yeast and sufficient sugar to prevent fermentation.

6. The process of producing a yeast preparation rich in enzymes and vitamines, which consists in heating in two steps to temperatures of about 55° C. and 100° C. respectively a mixture consisting of yeast and sufficient sugar to prevent fermentation.

7. The process of producing a yeast preparation rich in enzymes and vitamines, which consists in mixing yeast with sufficient sugar to prevent fermentation, kneading the mixture, heating it to about 55° C. in the course of about an hour, maintaining this temperature for about an hour, then heating it to about 100° C. in the course of about an hour, maintaining this temperature for about an hour, and finally cooling the mass.

8. An article of manufacture for use as baking preparation consisting of yeast and sufficient sugar mixed therewith with application of heat to produce liquefaction but not fermentation.

9. The process as claimed in claim 1 in which the quantity of sugar is substantially equal to the quantity of yeast.

10. The process as claimed in claim 1 in which the sugar consists of cane sugar.

In testimony whereof we hereunto affix our signatures in the presence of two witnesses.

RICHARD WILLSTÄTTER.
DR. HARRY SOBOTKA.

Witnesses:
ADOLF POLLINGER,
ERNST WALDSCHMID.